United States Patent
Holder

(10) Patent No.: US 7,412,780 B2
(45) Date of Patent: *Aug. 19, 2008

(54) TEMPLATE FOR INSPECTING AND MARKING REPAIR AREAS ON AN OBJECT

(75) Inventor: Paul F. Holder, Santa Clarita, CA (US)

(73) Assignee: Lockheed-Martin Corporation, Bethesda, MD (US)

( * ) Notice: Subject to any disclaimer, the term of this patent is extended or adjusted under 35 U.S.C. 154(b) by 274 days.

This patent is subject to a terminal disclaimer.

(21) Appl. No.: 11/018,087

(22) Filed: Dec. 20, 2004

(65) Prior Publication Data

US 2005/0232767 A1 Oct. 20, 2005

Related U.S. Application Data

(63) Continuation-in-part of application No. 10/355,582, filed on Jan. 30, 2003, now Pat. No. 6,910,278.

(51) Int. Cl.
*G01B 3/14* (2006.01)
(52) U.S. Cl. .......................................... 33/562; 33/530
(58) Field of Classification Search ........... 33/562–566, 33/530, 533, 613, 645, DIG. 1, 1 BB, 564, 33/565, 484, 485, 488; 235/492, 487
See application file for complete search history.

(56) References Cited

U.S. PATENT DOCUMENTS

| | | | | |
|---|---|---|---|---|
| 373,597 A * | 11/1887 | McMicken | ................. | 33/1 BB |
| 1,840,135 A * | 1/1932 | Schutt | ............................ | 7/164 |
| 2,355,161 A * | 8/1944 | Holstein | ..................... | 359/442 |
| 2,713,210 A * | 7/1955 | Lobachewski | ............... | 33/563 |
| 3,832,785 A * | 9/1974 | Miller | .......................... | 33/563 |
| 4,451,989 A * | 6/1984 | Leistiko | ....................... | 33/286 |
| 4,639,991 A * | 2/1987 | Sharon | ...................... | 29/889.7 |
| 5,033,200 A * | 7/1991 | Leung | ......................... | 33/485 |
| 5,285,785 A * | 2/1994 | Meyer | ........................ | 600/426 |
| 5,625,958 A * | 5/1997 | DeCoursey et al. | ........... | 33/555 |
| 5,741,212 A * | 4/1998 | Matthews | .................... | 600/300 |
| 6,192,595 B1 * | 2/2001 | Stewart | ....................... | 33/530 |
| 6,219,930 B1 * | 4/2001 | Reid | ............................ | 33/562 |
| 6,238,187 B1 * | 5/2001 | Dulaney et al. | ......... | 416/241 R |
| 6,571,484 B2 * | 6/2003 | Hastilow | ..................... | 33/546 |
| 6,769,618 B1 * | 8/2004 | Finkelstein | ................. | 235/487 |
| 6,910,278 B2 * | 6/2005 | Holder | ........................ | 33/562 |
| 7,024,787 B2 * | 4/2006 | Varsell et al. | ................. | 33/562 |
| 2002/0092190 A1 * | 7/2002 | Hofer et al. | .............. | 33/501.45 |

* cited by examiner

*Primary Examiner*—G. Bradley Bennett
*Assistant Examiner*—Amy Cohen Johnson
(74) *Attorney, Agent, or Firm*—Koestner Bertani LLP; Mary Jo Bertani

(57) ABSTRACT

A template for assessing damaged areas on an object, such as a fan blade or other item, includes a set of marks indicating the maximum areas of damage allowed on the periphery of the object. A guide enables the template to be aligned in proper position against the object for accurate visual inspection of the damaged areas. For example, one or more blend guides are included to allow the inspector to mark a blend area around the damage to enable maintenance personnel to smooth sharp, jagged edges of the damaged areas, thereby relieving stress points and improving the aerodynamic efficiency of a blade in an engine. The template can include a magnifying portion that allows the user to see more detail on the object. Linear and/or curved measurement scales can also be included on the template.

19 Claims, 6 Drawing Sheets

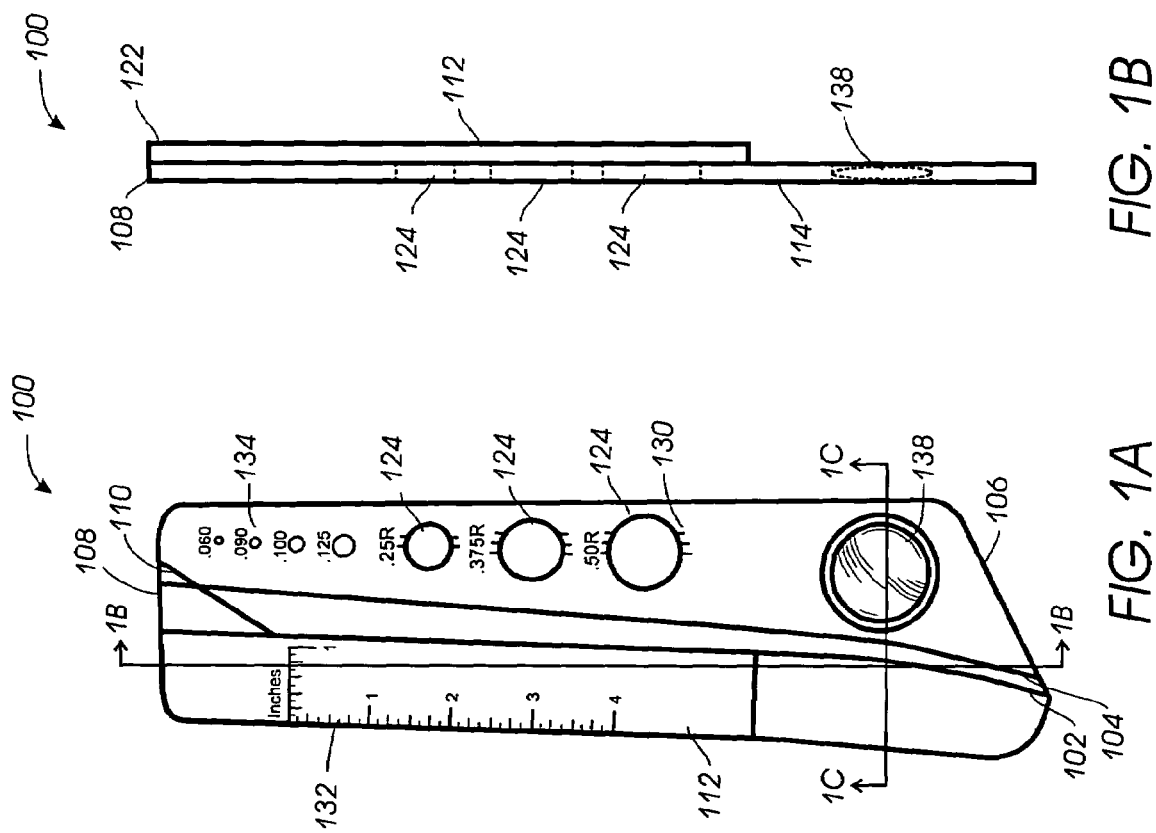

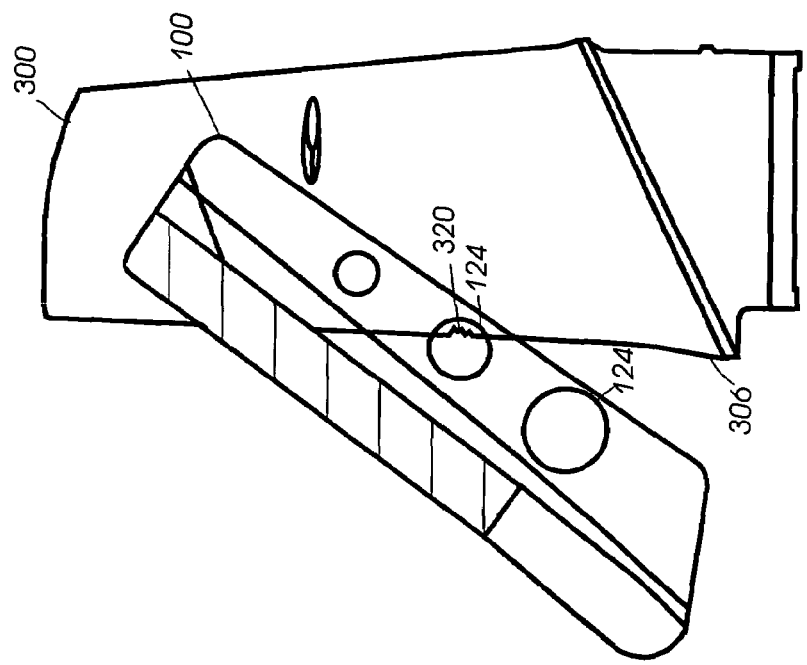
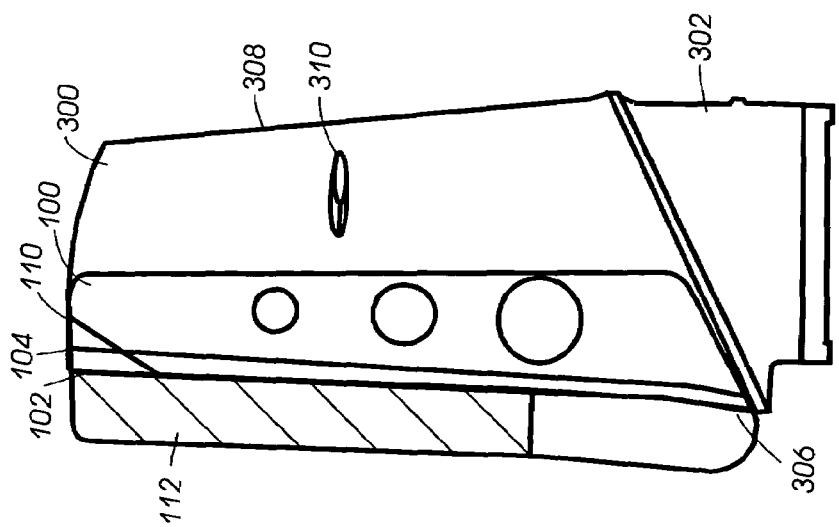
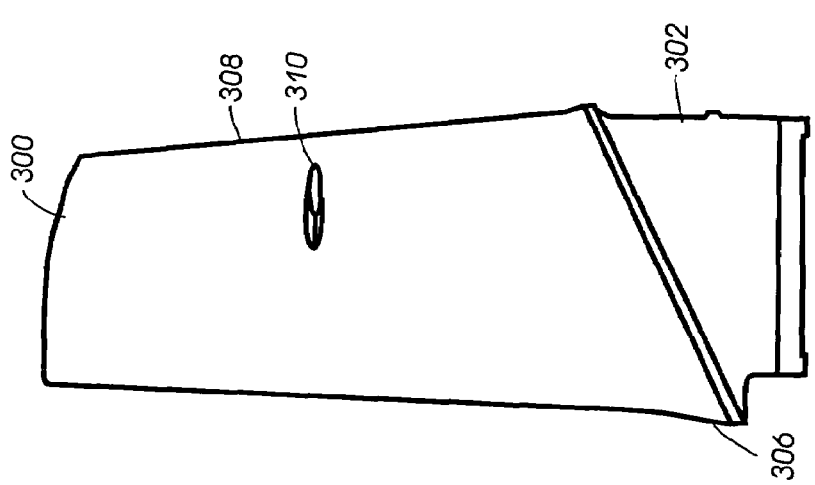

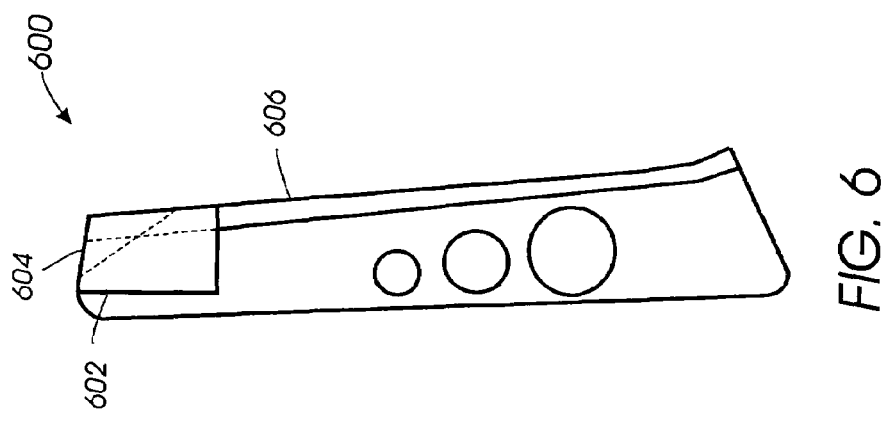
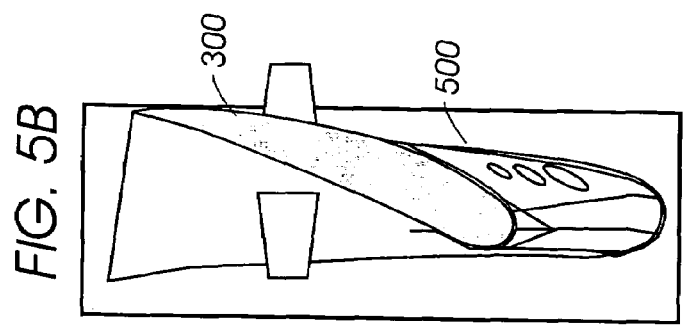
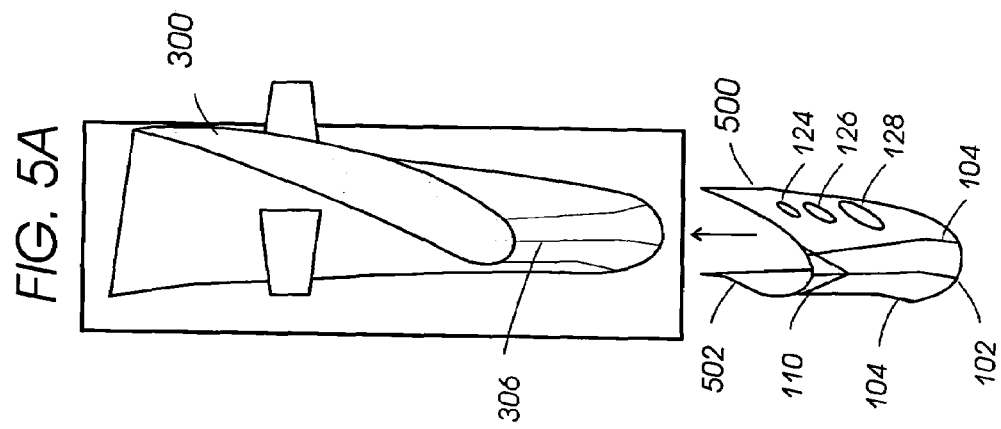

TEMPLATE FOR INSPECTING AND MARKING REPAIR AREAS ON AN OBJECT

STATEMENT OF GOVERNMENT INTEREST

The invention was made with Government support under contract F33657-98-D-0117, awarded by the U.S. Government. The U.S. Government has certain rights in this invention.

BACKGROUND

Foreign object damage (FOD) on aircraft turbine engine blades is a condition defined as any damage from small nicks and scratches to complete disablement or destruction of an engine caused by damaged parts of blades that break loose during operation. The blades rotate at very high speeds, and various levels of damage can be inflicted by foreign objects striking the blades, depending on the speed of the blades, the speed of the aircraft, and the size and hardness of the object.

FOD can be caused in a variety of ways including rocks or other hard objects being ingested by the engine during operation in the air or on the ground. Another source of FOD arises when components such as nuts, bolts, or tools are mistakenly left in or near the engine during maintenance. Additionally, leading and trailing edges of blades are subject to gradual erosion from abrasive sand and grit particles in the air that is ingested by the engine during operation. Another common source of engine FOD is in-flight icing that forms on the airframe or engine itself, breaks off and is ingested by the engine.

A typical engine has hundreds of blades which must be inspected for cracks, foreign object damage (FOD), and corrosion. Damaged and eroded blades degrade engine performance, as well as posing a potential cause of engine failure, and therefore must be replaced once the damage or erosion has exceeded a certain level. The flight crew is often not aware of FOD, however, in case of extensive damage, it can be indicated by vibration and changes in the engine's normal operating parameters. For example, damage to fan or compressor blades results in an increase in exhaust gas temperature (EGT), decrease in engine pressure ratio (EPR), and a change in the speed (RPM) ratio between the core engine and the fan section (N2/N1). Visual inspection for substantial damage to inlet fan blades and guide vanes is required to determine whether a blade can be repaired, or must be replaced.

A certain level of damage to a blade does not pose a serious threat to operational safety or performance. Guidelines regarding the extent of visible blade damage allowed are often provided to enable maintenance personnel to judge whether the blade must be repaired or replaced before further use. The amount of allowable damage can vary depending on the location of the damage along the length of the blade. The guidelines are typically expressed in terms of a percentage or amount of the leading and trailing edges of the chord (width) of the blade that may be missing before repair or replacement is required.

It is often difficult to visually gauge the amount of a blade that is missing without a measuring aid, such as a ruler. One known method of visual inspection includes marking damage limits at the tip and the bottom (root) of the blade. A straight line is drawn along the length of the blade between the marks at the tip and the root. The marks can be drawn on the leading edge and/or the trailing edge, depending whether both edges of the blade are damaged.

Once the allowable limits for damage to the blade are marked on the blade, the inspector can determine whether the blade must be replaced. When a damaged area on a blade is determined to be within a tolerable range, it is often desirable to blend the sharp edges of the damage to improve aerodynamic performance of the blade. The blending process also helps relieve stress points, thereby helping to avoid further cracking/damage to the blade during operation of the engine. Typically, an inspector will mark a small arc around the damaged area to indicate the area to be blended.

Thus, the inspector must measure along the length and the width of the blade to gauge each area of damage on both the leading and the trailing edges. Typically, a blade will have an aerodynamic contour that includes a cambered airfoil along the chord with a slight twist along the length of the blade. The contour can add to the difficulty of measuring the blade with a conventional straightedge ruler. Additionally, fan and compressor blades are typically tapered along their length from root to tip, further adding to the difficulty of determining whether the damage is within allowable limits. The problem is exacerbated on aircraft with inlet ducts, which do not allow easy access to inspect the blades.

A visual inspection of the engine fan blades is typically conducted on a routine basis. Considering the number of jet engines in service, millions of man-hours are required each year to complete the inspections. The blade inspection procedure outlined above is awkward, time-consuming, and prone to human error. It is therefore desirable to provide a device to facilitate more accurate and efficient visual fan and compressor blade inspection. It is also desirable to include a guide for marking the blend areas on the damaged portions of the blade with the inspection device.

SUMMARY

Embodiments of a template for assessing damaged areas on an object, such as a fan blade or other item, includes a set of marks indicating the maximum areas of damage allowed on the periphery of the object. A guide enables the template to be aligned in proper position against the object for accurate visual inspection of the damaged areas. For example, one or more blend guides are included to allow the inspector to mark a blend area around the damage to enable maintenance personnel to smooth sharp, jagged edges of the damaged areas, thereby relieving stress points and improving the aerodynamic efficiency of a blade in an engine. The template can include a magnifying portion that allows the user to see more detail on the object. Linear and/or curved measurement scales can also be included on the template.

Other advantages and features of the invention will become more apparent, as will equivalent structures which are intended to be covered herein, with the teaching of the principles of embodiments of the present invention as disclosed in the following description, claims, and drawings.

BRIEF DESCRIPTION OF THE DRAWINGS

A more complete understanding of embodiments disclosed herein and advantages thereof may be acquired by referring to the following description taken in conjunction with the accompanying drawings in which like reference numbers indicate like features and wherein:

FIG. 1A shows a front view of an embodiment of a template for inspecting an object such as a blade;

FIG. 1B shows a side view of the template of FIG. 1A;

FIG. 1C shows a cross-sectional view of the template of FIG. 1A;

FIG. 1D shows another embodiment of a template with an opening between an alignment guide and a damage limit mark;

FIG. 1E shows another embodiment of a template with alignment/damage limit marks around blend guides in the template;

FIG. 3A shows an embodiment of a typical fan blade in the first stage of a jet engine;

FIG. 3B shows the template of FIG. 1A overlaying the leading edge of the blade of FIG. 3A;

FIG. 3C depicts one of the blend guides on an embodiment of a template overlaying a damaged area of a turbine blade;

FIG. 5A shows a top perspective view of another embodiment of a template for inspecting the edge of a blade that is shaped to be retained on the blade during inspection;

FIG. 5B shows a top perspective view of the template of FIG. 5A engaging the blade; and FIG. 6 shows a view of the reverse side of another embodiment of a template for inspecting the edge of a blade that includes a sleeve to retain the template on the blade during inspection.

DETAILED DESCRIPTION OF THE EMBODIMENTS

Figure 2A:
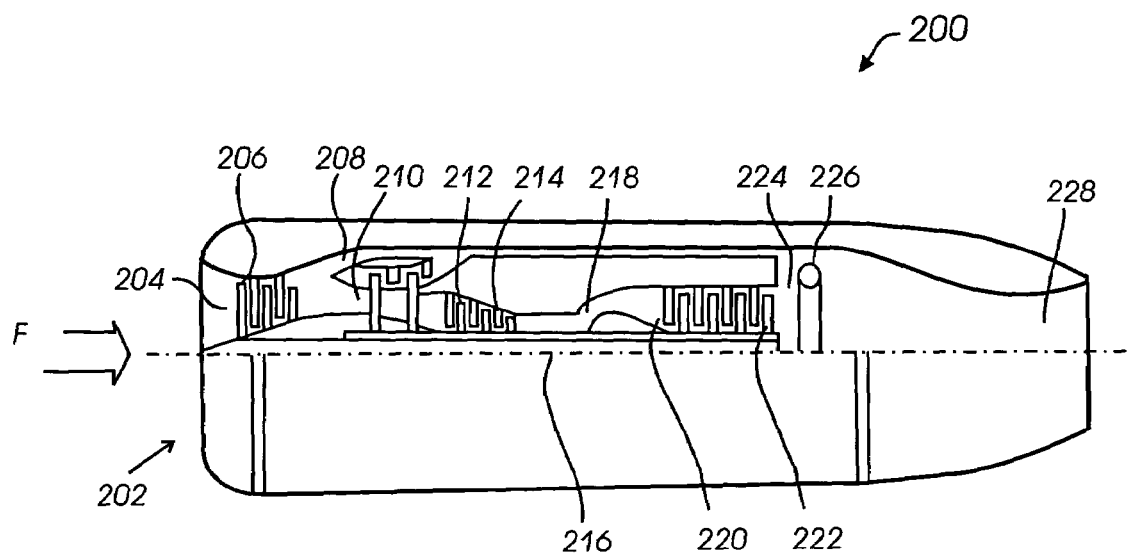
FIG. 2A shows a cross-sectional view of an embodiment of a turbofan engine.

Referring to FIGS. 1A through 1C, FIG. 1A shows a front view of an embodiment of template 100, which can be used to determine whether damage or erosion extends beyond allowable limits on virtually any type of blade. Template 100 is typically sized and shaped to substantially conform to at least a portion of the blade being inspected and includes one or more marks that indicate the maximum areas of damage allowed on any part of the blade, such as one or both of leading and trailing edges as well as the tip of a blade.

In the embodiment of template 100 shown in FIG. 1A, alignment mark 102 is provided to allow the inspector to align template 100 with at least a portion of the blade being inspected. When alignment mark 102 of template 100 is aligned with the corresponding portion of the blade, damage limit mark 104 provides an indication of the amount of the blade that can be damaged or eroded before the blade must be replaced. In the embodiment shown, damage that extends between alignment mark 102 and damage limit mark 104 is considered to be within an allowable range. Damage that extends from alignment mark 102 to beyond damage limit mark 104 exceeds the allowable range, and indicates that the blade should be replaced.

Alignment mark 102 and damage limit mark 104 are shown as lines extending from root 106 to tip 108 with a slight curvature near the root 106 in the embodiment of template 100 shown in FIG. 1A. The distance between alignment mark 102 and damage limit mark 104 increases gradually from root 106 to tip 108. Thus, a greater amount of damage to the leading edge of the blade is allowed at tip 108 than at root 106. One reason for allowing more damage near the tip 108 is because smaller pieces of the blade are less likely than larger, heavier pieces to be projected outside the engine.

In other embodiments, the length, shape, and distance between alignment mark 102 and damage limit mark 104 can vary, depending on the shape of the blade, the areas to be inspected, and the amount of allowable damage different areas of the blade can sustain before the blade is replaced.

Alignment mark(s) 102 can be positioned to indicate all or a portion of the leading edge, trailing edge, tip, root, and/or other portions of a blade that is sufficient to align template 100 for visual inspection of the blade. Further, more than one damage limit mark 104 and/or alignment mark 102 can be included on template 100. Different combinations of damage limit mark(s) 104 and alignment marks 102 can be included on the same template 100 so that the template 100 can be used to inspect different blades having different profiles and damage tolerances. Separate templates for each blade configuration are typically utilized, however.

Template 100 can also include other types of damage limit marks 104 to indicate whether damage to various other portions of the blade are within pre-specified tolerances. An example of another type of damage limit mark shown on the embodiment of template 100 in FIG. 1A is tip chamfer mark 110, which extends upward at an angle from alignment mark 102 to tip 108 of template 100. In the example shown, tip chamfer mark 110 extends beyond damage limit mark 104 at the tip 108 of template 100, however, the length, shape, and angle of tip chamfer mark 110 between alignment mark 102 and tip 108 can vary, depending on the shape of the blade, and the amount of allowable damage that can be sustained at the tip of the blade before the blade must be replaced.

FIGS. 1B and 1C show a side view and a cross-sectional view, respectively, of template 100 with alignment guide 112 coupled to one side of face plate 114. Alignment guide 112 enables an inspector to align template 100 in proper position against the blade for accurate visual inspection of the damaged areas. In the embodiment shown, alignment guide 112 includes a raised side portion 116 that coincides with at least a portion of alignment mark 102. The thickness of the raised portion is selected so that the alignment guide 112 can be abutted against a portion of the blade to properly position alignment mark 102 and damage limit mark 104 relative to the portion(s) of the blade to be inspected.

Alignment guide 112 can be fastened to face plate 114 using any suitable attachment means, such as adhesive or other type of bonding, mechanical fasteners, or co-formed in a unitary construction with face plate 114. In the embodiment shown, alignment guide 112 is a rectangularly-shaped portion of material having a first side 118 aligned with a portion of an outer edge 120 of face plate 114. A top portion 122 of alignment guide 112 is aligned with a portion of tip 108 of face place 114. Raised side portion 116 of alignment guide 112 is aligned with a portion of alignment mark 102. Notably, alignment guide 112 is an optional feature of template 100 and other embodiments of alignment guide 112 can have other suitable shapes and be positioned at other suitable locations on template 100.

In one embodiment, face plate 114 is fabricated with clear mylar that is 0.007 inch thick, and alignment guide 112 is fabricated with a polycarbon material that is 0.06 inch thick. Alignment mark 102, damage limit mark 104, and tip chamfer mark 110 are printed on template 100 using a lithographic printing process, or any other suitable marking process. The position of damage limit mark 104 is derived from maintenance manual data that provides dimensions of allowable blend areas for a particular type of blade.

Template 100 can also include one or more blend guides 124 that allow a user to make blend marks around damaged areas to indicate the maximum amount of blade that may be removed without exceeding the maximum damage limit mark 104 during the blending process. Maintenance personnel can use the blend marks as limits of the area of material that can be removed from blade 100 to smooth sharp, jagged edges of the damaged areas, thereby relieving stress points on the blade and improving the aerodynamic efficiency of the blade.

The embodiment of the template 100 shown includes three circular blend guides 124. One or more of blend guides 124 can have a different radius of curvature than the others. The smallest blend guide 124 can be sized according to the minimum allowable blend radius. Blend guides 124 can be formed by forming openings in template 100. Template 100 can, however, include blend guides that are formed using any suitable method and have different shapes and sizes than shown in the embodiment of template 100 in FIG. 1A. Additionally, a blend guide 126 formed as an opening (indicated by crosshatching) in at least a portion of the area between alignment mark 102 and damage limit mark 104 can be included in template 100, as shown in FIG. 1D. A user can place template 100 over the blade to mark a boundary around the damaged area in the space allotted by opening 126. The user can then use an appropriately sized blend guide 124 to mark a blend area on the blade, as desired or required.

In some embodiments, template 100 can include one or more sets of template markings 130a, 130b, 130c (collectively referred to with reference number 130) around circular blend guides 124. Markings 130 can be configured to approximately indicate whether a blend mark around a damaged area on the blade will be within a pre-specified tolerance, such as damage limit mark 104. Referring to FIGS. 1A and 1E, FIG. 1E shows sets of arrows indicating distances a, b, c between alignment mark 102 and damage limit mark 104 near the bottom, middle, and top, respectively, of template 100. Markings 130a, 130b, 130c correspond to distances a, b, c. Markings 130 shown around the opening of blend guides 124 can be used to align template 100 with an edge of the blade when a particular blend guide 124 is positioned over a damaged area. Dashed lines are shown in the openings between markings 130a 130b, or 130c for convenience in FIG. 1E to indicate alignment with an edge of the blade. The dashed lines would otherwise typically not appear in the openings. The user can determine whether to align template 100 using markings 130a, 130b, or 130c based on the position of the damaged area. For example, mark 130a can be used for damage to the lower portion of the blade, while marks 130b and 130c can be used for damage near the middle and upper portions, respectively, of the blade. In some embodiments, portions of damage limit mark 104, such as the top, middle, and bottom of damage limit mark 104, can be color-coded. Marks 130 can be color-coded to correspond to the portion of damage limit mark 104 with which the marks 130 are associated.

Referring again to FIG. 1A, one or more measuring scales 132, 134 can be included on template 100 to allow a user to measure a damaged area of the blade. Measuring scale 132 is shown as two linear scales orthogonal to one another. Such a configuration allows the user to determine the height and width of the damaged area. Measuring scale 134 is shown as a series of curved (circular) marks of different sizes that can be overlaid over the blade to determine the diameter of the damaged area. Other suitably shaped and sized measuring scales can be included on template in addition to or instead of measuring scales 132, 134. Although linear measuring scales 132 are shown along a straight edge of template 100, measuring scales 132, 134 can be positioned at any suitable location on template 100. Note that markings that indicate the units of measurement of measuring scale(s) 132, 134 can also be included on template 100.

Some embodiments of template 100 can further include magnifying portion 138 that can be used to view at least a portion of the blade being inspected in more detail. Magnifying portion 138 can be any suitable size, shape, and magnifying power, and can also be configured to be removed from and coupled to template 100. For example, magnifying portion 138 can be fabricated with materials that allow a rim around magnifying portion 138 to snap into and out of template 100. One of blend guides 124 can be used to retain magnifying portion 138 in template 100, although another opening, sleeve, or other suitable structure can be provided in template 100 for this purpose. Magnifying portion 138 can also be configured with the same or smaller thickness as template 100 to prevent magnifying portion 138 from causing a bump in template 100 when template 100 is overlaid on the blade. Additionally, a tether (not shown) can be coupled between magnifying portion 138 and template 100 to prevent magnifying portion 138 from being dropped or otherwise completely separated/lost from template 100.

Further, a lighting device (not shown), such as a light emitting diode or other suitable lighting device, can be included in template 100 to help illuminate the damaged area during inspection. A power source such as a battery or other suitable power source can be coupled to provide power to the lighting device. An on/off switch can be mounted on or at least partially embedded in template 100 and coupled between the power source and the lighting device to allow the user to control operation of the light. In some embodiments, the lighting device can be configured around the rim of magnifying portion 138 or other suitable location to illuminate at least a portion of the damaged area as magnifying portion 138 is positioned adjacent the damaged area.

In some embodiments, template 100 is configured to substantially correspond to the size and shape of the entire blade to be inspected. In other embodiments, template 100 is configured to correspond to only a portion of the blade to be inspected, such as the leading edge, a portion of the leading edge, the tip, a portion of the tip, the trailing edge, a portion of the trailing edge, or the periphery of the blade.

In one method of inspection, template 100 is slid along a side of the blade until alignment guide 112 contacts the edge of the blade. The tip 108 of template 100 is aligned with the tip of the blade, and the damage is assessed in relation to damage limit mark 104 and tip chamfer mark 110. If the damaged area is within damage limit mark 104, the damaged area is marked for blending using the appropriate size blend guide 124.

Face plate 114 is typically fabricated with a flexible material that allows face plate 114 to adapt to the contours of the blade during inspection. The material used for face plate 114 is also typically transparent to allow viewing of damage to the blade when template 100 is overlaid on the blade. Alignment guide 112 can be fabricated using the same material as face plate 114, or any other suitable material. Typically, the material used for alignment guide 112 does not compress or otherwise change shape when abutted against the edge of the blade. The material used for alignment guide 112 can, but is not required to be transparent. Alternatively, template 100 may be fabricated with rigid material that is formed to similar contours of the blade(s) to be inspected.

Referring now to FIG. 2A, a partial side cross-sectional view of an embodiment of an axial flow jet aircraft engine 200 is shown as an example of the type of device in which blades are installed and inspected on a routine basis. Air flow F enters jet engine 200 through intake 202. Fan section 204 is located at the very front of engine 200 and comprises a plurality of rotating fan blades 206 that push airflow F into bypass section 208 and compressor section 210. Compressor section 210 is comprised of a plurality of rotating rotor blades 212 and stationery stator blades 214.

Rotor blades 212 compress airflow F into combustion chamber 214 and force airflow F rearward while continuing the direction of airflow F parallel to centerline axis 216 of engine 200. The action of rotor blades 212 increases air compression at each stage and accelerates airflow F rearward. By virtue of this increased velocity, energy is transferred from compressor section 210 to airflow F in the form of velocity energy. Thus, the purpose of compressor section 210 is to take in ambient airflow F, increase the speed and pressure, and discharge airflow F into combustion chamber 218.

Fuel is mixed with airflow F in combustion chamber 218 and ignited, thereby adding energy to airflow F, resulting in an increased pressure and temperature of airflow F. Pressure within combustion chamber 218 forces airflow F into turbine section 220, which is comprised of a plurality of turbine blades 222. Turbine section 220 removes some energy from airflow F to power compressor section 210 and fan section 204. Airflow F then passes into exhaust chamber 224 where it combines with the flow from bypass section 208. An afterburner 226 can provide additional fuel which is ignited to increase the energy of airflow F. Airflow F is then expelled from engine 200 through nozzle 228 as an exhaust flow.

Figure 2B:
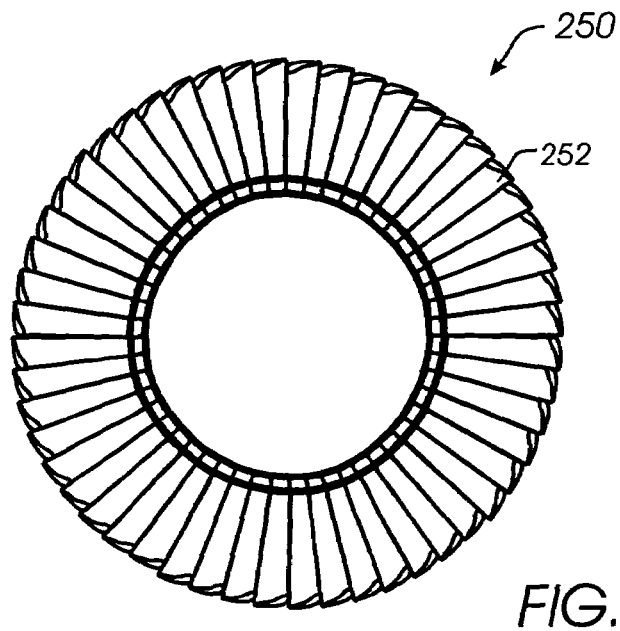
FIG. 2B shows a front view of an embodiment of a rotor assembly that is representative of a fan or compressor stage in the engine of FIG. 2A.

FIG. 2B shows a front view of an embodiment of a rotor assembly 250 that is representative of rotors in the fan section 206, compressor section 210 and turbine section 220 in engine 200 (FIG. 2B). Each set of rotating and stationery (stator) blades comprises a "stage" of fan section 206, compressor section 210 and turbine section 220. The number of stages included in engine 200 depends on the pressure of airflow F required at the beginning and end of compressor section 210, and at the beginning and end of turbine section 220. The size of the blades 252 in blade assembly 250 typically varies for each stage of compressor section 210 and turbine section 220.

Engine 200 can be enclosed in a nacelle mounted externally on an aircraft, or incorporated internally in the aircraft. Objects that can cause damage to blades throughout each section of engine 200 are typically ingested via intake 202 when engine 200 is operating on the ground and in flight. Access ports are typically located near the rotating blade assemblies to allow inspectors to visually inspect the blades using optical or video borescopes while the engine 200 is still mounted in the aircraft. Often, damage to blades at the opening of intake 202 indicates whether other blades in the engine may be damaged. Engine removal and disassembly is usually required for detailed inspection of blades other than first stage fan blades.

FIG. 3A shows an embodiment of a fan blade 300 that can be utilized in a device such as engine 200 (FIG. 2A) and inspected using template 100 (FIG. 1A). Blade 300 includes a root portion 302 that is used to mount and retain blade 300 in a circular rotating fan assembly comprised of a plurality of blades 300, such as blade assembly 250 shown in FIG. 2B. Blade 300 also has leading edge 306 and trailing edge 308. A mid-span damper 310 is a horizontal fin that can be included on both sides of blade 300 to stabilize vibration of blade 300 during operation.

FIG. 3B shows template 100 overlaying blade 300 with alignment mark 102 aligned with leading edge 306 of blade 300. Alignment guide 112 provides a mechanical stop that allows template 100 to be properly positioned against leading edge 306 to determine whether any damage that may be present on blade 300 is within damage limit mark 104 and tip chamfer mark 110.

FIG. 3C depicts template 100 and blade 300 with blend guide 124 overlaying a damaged area 320 of blade 300. Once an inspector determines that damaged area 320 is within damage limit mark 104, he or she can use blend guide 124 to mark the area to indicate the maximum amount of leading edge 306 that can be removed during the blending process without exceeding damage limit mark 104. Once the damaged area 320 is marked, template 100 can again be overlaid on blade 300 as shown in FIG. 3B to ensure the mark around the damaged area 320 does not exceed damage limit mark 104. Maintenance personnel are thus provided with an accurate marking of the allowable blend area around damaged area 320.

Figure 3D:
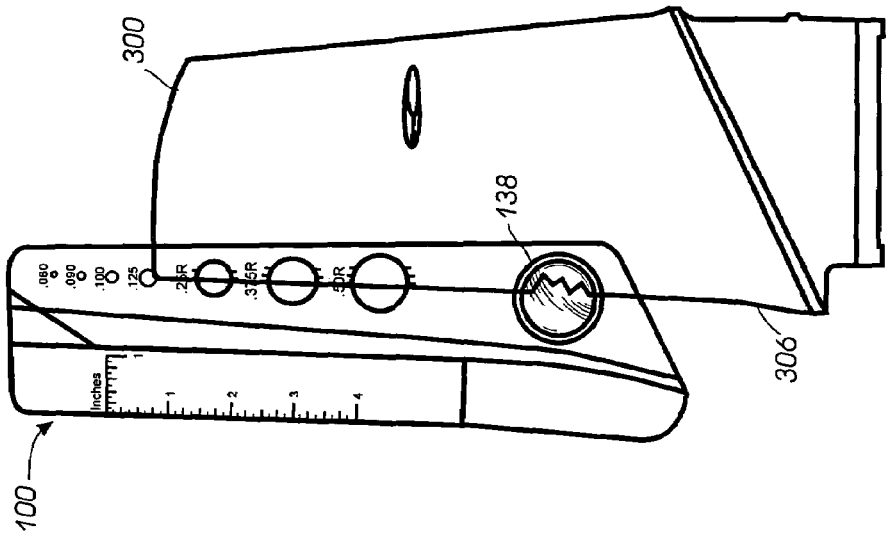
FIG. 3D depicts one of the blend guides on the template of FIG. 1A overlaying a damaged area of a turbine blade.

FIG. 3D depicts one of blend guides 124 on template 100 overlaying a damaged area of turbine blade 300, with marks 130b around blend guide 124 aligned with leading edge 306 of blade 300. Using alignment marks 130b allows the user to determine whether the required blend radius will be at least approximately within the damage limit mark 104. Note that a user can align template 100 in between alignment marks 130 when the damaged area is between the bottom and middle, or the middle and top portions of blade 300.

Figure 3E:
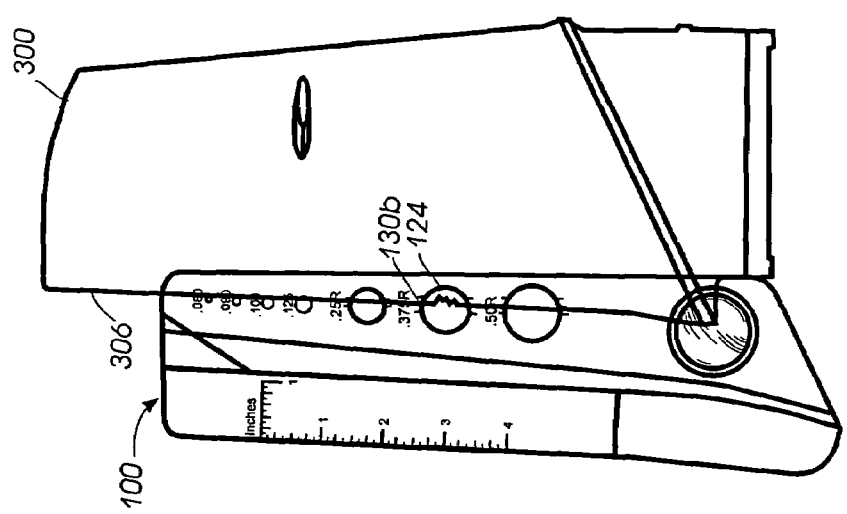
FIG. 3E depicts a magnifying portion of the template of FIG. 1A overlaying a damaged area of a turbine blade.

FIG. 3E depicts an embodiment of magnifying portion 138 of template 100 overlaying a damaged area of turbine blade 300 to increase the amount of detail of the damaged area during inspection. Magnifying portion 138 may help reveal hairline cracks or other features of the damaged area that would otherwise be difficult to see.

Figure 4B:
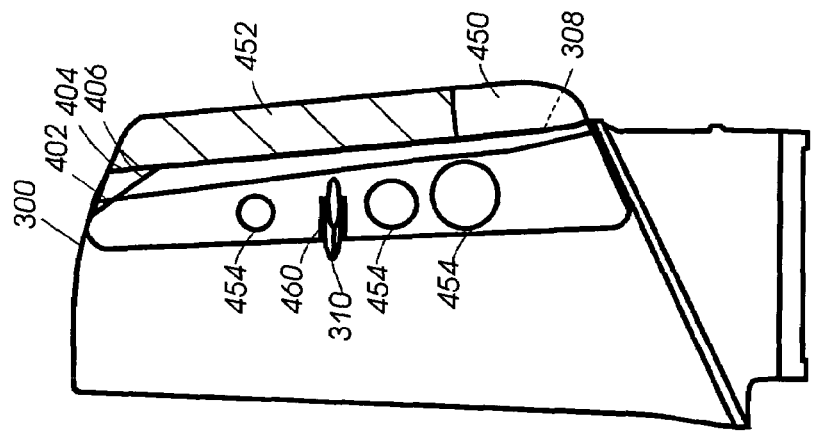
FIG. 4B shows another embodiment of a template for inspecting the trailing edge of a blade overlaying the blade of FIG. 3A.
Figure 4A:
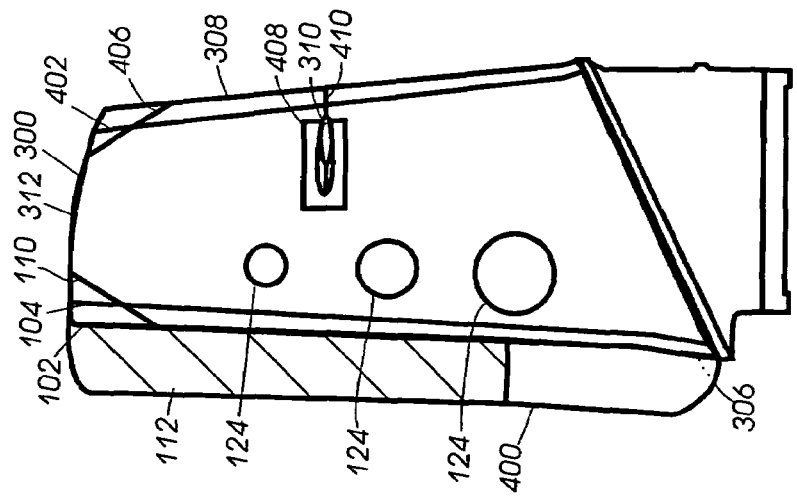
FIG. 4A shows another embodiment of a template for inspecting leading and trailing edges of a blade overlaying the blade of FIG. 3A.

FIG. 4A shows another embodiment of a template 400 for inspecting leading edge 306, trailing edge 308, and tip 312 of blade 300. In addition to alignment mark 102, damage limit mark 104, tip chamfer mark 110, edge guide 112, and blend guides 124 included on template 100 (FIG. 1A), template 400 also includes damage limit mark 402, and tip chamfer mark 406.

When template 400 is sized to substantially match the size of blade 300, an alignment mark for trailing edge 308 of blade 300 is typically not required. A trailing edge alignment mark (not shown) can be provided, however, in other embodiments.

When blade 300 includes damper 310, cutout 408 and slit 410 can be provided in template 400 to allow template 400 to be positioned properly against blade 300.

FIG. 4B shows another embodiment of a template 450 for inspecting trailing edge 308 of blade 300. Template 450 is similar to a reverse image of template 100 (FIG. 1A) and includes damage limit mark 402, alignment mark 404, tip chamfer mark 406, alignment guide 452, and blend guides 454. Notch 460 can be provided to allow proper positioning of template 450 against blade 300 when blade 300 includes damper 310 and the edge of template 450 extends past damper 310.

A mechanism for retaining the blade inspection template in position on the blade can be included. FIGS. 5A and 5B show a top perspective view of an example of a template 500 for inspecting an edge and tip of blade 300 that includes a clip portion 502 to retain template 500 on blade 300. Template 500 includes alignment mark 102 on the leading edge of template 500 that corresponds to leading edge 306 of blade 300. Damage limit marks 104 and tip chamfer marks 110 are included on either side of alignment mark 102. One or more blend guides 124 can also be included on template 500.

Damage limit marks 104 and tip chamfer marks 110 on both sides of alignment mark 102 allow blade 300 to be inspected from either side of blade 300. Clip portion 502 curves around an edge of blade 300, and exerts a gripping force to retain template 500 on blade 300. Template 500 is formed to correspond to the contours of the blade(s) to be inspected using any type of material that can flex to engage blade 300, and return to its previous shape when removed from blade 300. A transparent material allows blade 300 to be viewed under template 500.

Other mechanisms for retaining various embodiments of a blade inspection template on a blade can also be included, in addition to, or instead of clip portion 502. Another example of a retaining mechanism is shown on an embodiment of template 600 in FIG. 6 as sleeve 602. In the embodiment shown, sleeve 602 is portion of material attached or formed on the reverse side of template 600 along at least a portion of tip 604 and adjacent alignment edge 606 of template 600. Sleeve 602 is typically most useful to retain template 600 on blades with tips that are not tapered toward the edge to be inspected, and where adequate clearance is available to slip sleeve 602 over the tip of the blade.

Another example of a method for retaining blade inspections templates on the blade to be inspected includes the use of magnets attached to or embedded in the template. Magnets will only be effective, however, in situations where the blades to be inspected have magnetic properties.

Some embodiments of the templates can be configured to be used for inspecting suitable objects other than blades. Various embodiments of the inspection templates provide a convenient and effective tool for inspecting and marking damage on blades, as well as other objects. The templates can be sized and shaped to be used with virtually any type of blade including blades found in engines, as well as other objects in other types of equipment. The templates can be used to inspect, mark, and blend-repair the objects while the objects are installed, and even when the objects are disassembled from the equipment in which the objects are used. In aircraft engines, this capability not only restores degraded performance from damaged blades, but in many cases can also avoids removal of the equipment from service, thereby dramatically reducing maintenance costs.

While various examples of embodiments disclosed herein have been described, it will be understood that these embodiments are illustrative and that the scope of the claims is not limited to them. Many variations, modifications, additions and improvements of the embodiments described are possible. Those having ordinary skill in the art will readily implement the steps necessary to provide the structures and methods disclosed herein. Variations and modifications of embodiments disclosed herein may be made without departing from the scope of the following claims. In the claims, unless otherwise indicated the article "a" is to refer to "one or more than one".

What I claim is:

1. A blade inspection template comprising:
   a first damage limit mark on the template, wherein the template is configured to be overlaid on the blade to determine whether a damaged portion of the blade is within the damage limit mark, and the damage limit mark is a straight line extending from root to tip of the template with a slight curvature near the root;
   a magnifying portion positionable to view at least a portion of the blade in more detail; and
   a plurality of blend guides with different curvatures, at least one of the blend guides indicates a portion of material that can be removed from the object to repair the damaged area, the blend guides comprise holes through the template.

2. The template of claim 1, further comprising:
   a positioning guide configured to align the template in a desired position with respect to the blade.

3. The template of claim 2, wherein the template is fabricated with transparent material to allow the blade to be viewed when the template is overlaid on the blade.

4. The template of claim 3, the magnifying portion is configured to be inserted in and removed from the template.

5. The template of claim 2, wherein the positioning guide includes a raised portion to rest against a portion of the blade when the template is overlaid on the blade.

6. The template of claim 1, further comprising:
means for retaining the template on the blade; and
a tip chamfer mark indicating a blade corner trim limit.

7. The template of claim 1, wherein the magnifying portion is insertable in one of the blend guides.

8. The template of claim 1, further comprising at least one of a linear and a curved measuring scale.

9. The template of claim 1, further comprising:
a blade alignment mark indicating at least a portion of the blade against which the template can be aligned during inspection.

10. An inspection template comprising:
an opening in the template, wherein the opening is positionable over a damaged area of an object to allow a blend mark to be made around the damaged area on the object, further wherein the blend mark indicates an area of material that is to be removed from the periphery of the object to repair the damaged area;
an alignment mark;
a damage limit mark, wherein the distance between the alignment mark and the damage limit mark increases gradually from tip to root of the template; and
markings around the opening to indicate whether the damaged area on the object is within a pre-specified tolerance when the opening is positioned over the damaged area.

11. The template of claim 10, further comprising:
a measuring scale marked on the template and markings that indicate the units of measurement of the scale.

12. The template of claim 10, wherein the template is fabricated with flexible material to allow the template to substantially conform to the contour of the object when the template is placed against the object.

13. The template of claim 10, wherein the alignment guide includes a raised portion that is abuttable against a leading or a trailing edge of the object.

14. The template of claim 10, further comprising at least one of the group consisting of: a sleeve portion configured on the template, wherein the sleeve portion is closed along at least a portion of an edge of the object; a clip portion; and a magnetic portion, to retain the template on the object during inspection.

15. The template of claim 10, further comprising a magnifying portion configured to provide a close-up view of at least a portion of the object.

16. The template of claim 15, wherein the magnifying portion is configured to be removable and attachable to the template.

17. An inspection template comprising:
a magnifying portion positionable to view at least a portion of an object being inspected in more detail;
a damage limit mark indicating the amount of damage allowable on at least a portion of the periphery of the object;
an alignment mark;
a tip chamfer mark that extends at an angle from the alignment mark to a tip of the template; and
a repair guide positionable to mark a repair area around a damaged portion of the object that is within the damage limit mark.

18. The template of claim 17, wherein the magnifying portion is embedded in an opening in the template and is configured with the same or smaller thickness as the template.

19. The template of claim 17, further comprising a tether coupled between the magnifying portion and the template.

* * * * *